United States Patent

Szabo

[15] 3,652,949

[45] Mar. 28, 1972

[54] DIFFERENTIAL AMPLIFIER WITH COMMON MODE REJECTION

[72] Inventor: Andras I. Szabo, Export, Pa.

[73] Assignee: Westinghouse Electric Corporation, Pittsburgh, Pa.

[22] Filed: Dec. 16, 1969

[21] Appl. No.: 885,406

[52] U.S. Cl. ............................330/30 D, 330/28, 330/30 R, 330/69

[51] Int. Cl. ............................H03f 3/68

[58] Field of Search ............330/30, 30 D, 69, 28; 307/235, 307/218

[56] References Cited

UNITED STATES PATENTS

| | | | |
|---|---|---|---|
| 3,401,351 | 9/1968 | Ellestad | 330/69 |
| 3,413,492 | 11/1968 | Schneider | 307/218 X |
| 3,315,089 | 4/1967 | Mayne | 330/30 X |
| 3,519,848 | 7/1970 | Vercellotti | 330/30 X |
| 3,519,850 | 7/1970 | Smith | 330/30 X |

*Primary Examiner*—Roy Lake
*Assistant Examiner*—Lawrence J. Dahl
*Attorney*—F. H. Henson and R. G. Brodahl

[57] ABSTRACT

Described is a differential amplifier, particularly adapted for use as a sense amplifier for computer core memory units, which has a high common-mode voltage rejection factor. This is accomplished in a symmetrical amplifier configuration, without the need for a constant current source, by applying differential voltages to the bases of a pair of transistors having resistors connected in shunt with their collector-base junctions, resistors connecting their collectors to a common course of potential, resistors connecting their emitters to a common source of potential, and a low impedance path between the emitters of the transistors. By properly proportioning the resistors, the voltages at the collectors of the transistors will remain constant for all common-mode voltages; but, because of the aforesaid low impedance path, will be different when different voltages are applied to both bases of the transistors.

8 Claims, 3 Drawing Figures

DIFFERENTIAL AMPLIFIER WITH COMMON MODE REJECTION

BACKGROUND OF THE INVENTION

As is known, a differential amplifier should amplify only the instantaneous difference between two input signals. If the two input signals are equal, the output should be zero. In a sense amplifier for a computer core memory, for example, the opposite ends of a sense winding of a magnetic core memory are connected to the two inputs of the differential amplifier such that the voltages at the two inputs to the amplifier will be different with respect to a reference voltage or signal ground; and an output will be produced from the amplifier only in response to a true change in flux in the magnetic core. As in any electrical circuit, however, spurious signals or noise will be picked up at the input terminals of the amplifier. These signals, since they are not out of phase, are called "common-mode voltages;" and, in the absence of some means for eliminating them, will produce a false output from the amplifier.

The most important quality of computer core memory sense amplifier must have is high common-mode rejection over the entire bandwidth. This is particularly true in high speed applications where the size of the magnetic cores is reduced, since the useful differential signal induced in the sense winding has a tendency to fall with core size, while the common-mode noise tends to increase as the core size is reduced. The common-mode noise increases partly because the various stray couplings between the different windings of the computer memory unit are more significant at higher speeds, and partly because the stray couplings themselves are increased as a result of the higher core density achievable with smaller cores.

In the past, sense amplifiers for low speed computers usually relied on transformer coupling for insuring adequate common-mode rejection. The main disadvantage of this approach is that the attenuation of high frequency common-mode noise is seriously limited by the interwinding capacitance of the transformer, particularly when an attempt is made to apply such a technique to high speed computers.

Another circuit configuration frequently used in sense amplifiers is a differential amplifier stage with a current source in the emitter circuit. High common-mode rejection is achieved in such a stage by virtue of the very high impedance of the current source. While this approach can insure excellent common-mode rejection at low frequencies, the performance deteriorates rapidly as the frequency is increased. This deterioration is caused by the inevitable stray capacitances of the circuit.

Furthermore, since the current source is normally constructed from a transistor, a diode, and three resistors, the presence of these components spoils the otherwise perfect symmetry of the differential amplifier stage, making a symmetrical layout of the sense amplifier impossible. Symmetrical layout, however, is particularly important if more than one amplifier stage must be used in cascade to achieve the desired gain, since any unbalance in the first stage can lead to the spurious conversion of a common-mode signal to a stray differential component, which will then be further amplified by the following stages. The signal available from small ferrite core memories for high speed computers is such that at least two amplifier stages must be used in cascade. As a result, perfect balance in the first stage is of very great importance.

SUMMARY OF THE INVENTION

As an overall object, the present invention seeks to provide a new and improved differential amplifier which achieves good common-mode rejection while maintaining perfect circuit symmetry.

Another object of the invention is to provide a differential amplifier of the type described which is particularly adapted for use as a sense amplifier for high speed computers employing high density core memory units (i.e., closely spaced magnetic cores of small size).

In accordance with the invention, a differential amplifier is provided comprising a pair of transistor devices each having an emitter, a base and a collector, means for applying two equal and opposite voltages to the respective bases of the transistors, a first pair of resistors connected in shunt with the base-collector junctions of said transistors, a second pair of resistors connecting the respective emitters of said transistors to a source of potential of one polarity, means connecting the collectors of said transistors to a source of potential of the opposite polarity, an electrical connection between said emitters, and output amplifying devices connected to the collectors of the transistors.

In order to provide for common-mode signal rejection, the resistance, $R_f$, of the resistors in shunt with the base-collector junctions of the transistors, and the resistance, $R_p$, of the two emitter resistors must satisfy the equation:

$$R_f=\frac{1}{\alpha}(R_p+r_e)$$

where $r_e$ is the equivalent circuit emitter resistance of each of the respective transistors and $\alpha$ is the common base current gain of the respective transistors. Assuming that the resistances $R_f$ and $R_p$ satisfy the foregoing equation, common-mode voltages applied to the input terminals of the differential amplifier will not change the voltage levels at the collectors of the transistors; and no change in signal level will appear at the outputs of the amplifying devices in response to such common-mode voltages. At the same time, and in contrast to common-mode voltages, true differential voltages produce opposite polarities across the transistors; and, by virtue of the connection between the emitters of the transistors, the voltages at the collectors of the transistors will no longer remain the same, thereby producing an output signal from the amplifier to indicate the existence of a differential input signal.

The above and other objects and features of the invention will become apparent from the following detailed description taken in connection with the accompanying drawings which form a part of this specification and in which:

FIG. 1 is a schematic circuit diagram illustrating one embodiment of the invention;

FIG. 2 is an equivalent circuit of part of the circuitry shown in FIG. 1; and

FIG. 3 is an equivalent circuit of another portion of the circuitry of FIG. 1 incorporated herein for purposes of explanation.

DESCRIPTION OF THE DRAWING

With reference now to the drawing, numeral 10 designates the sense winding of a magnetic memory, such as a ferrite core memory used for computer applications. In response to a change in flux in a core, a voltage may be induced in the winding 10 across terminals 12 and 14 with the polarity shown. That is, terminal 12 will be positive with respect to terminal 14. These voltages are applied through the windings of a balun transformer 16 across resistors 18 and 20, the junction of these two resistors being connected through lead 22 to the input signal ground potential. At the same time, the balun transformer 16 acts as a choke for common-mode signals. That is, common-mode signals will have the same polarity as applied to terminals 12 and 14. The transformer 16, however, does not entirely eliminate all of the common-mode voltages.

The signal of one polarity appearing across resistor 18 is applied to the base of NPN transistor 24. Similarly, the voltage across resistor 20 is applied to the base of NPN transistor 26. The emitters of transistors 24 and 26 are connected through resistors 28 and 30, respectively, to a source of −5 volts; while their collectors are connected through resistors 32 and 34 respectively to a source of plus 17.5 volts. The collectors of transistors 24 and 26 are also connected to the bases of output amplifying devices comprising NPN transistors 36 and 38. The emitters of transistors 36 and 38 are interconnected through resistor 40 and are also connected to a source of minus 5 volts through resistors 42 and 44. Their collectors are connected through resistors 46 and 48, respectively, to the source of +17.5 volts, and are also connected through resistors 50 and 52, respectively, to the collectors of the transistors 24 and 26.

Figure 1:
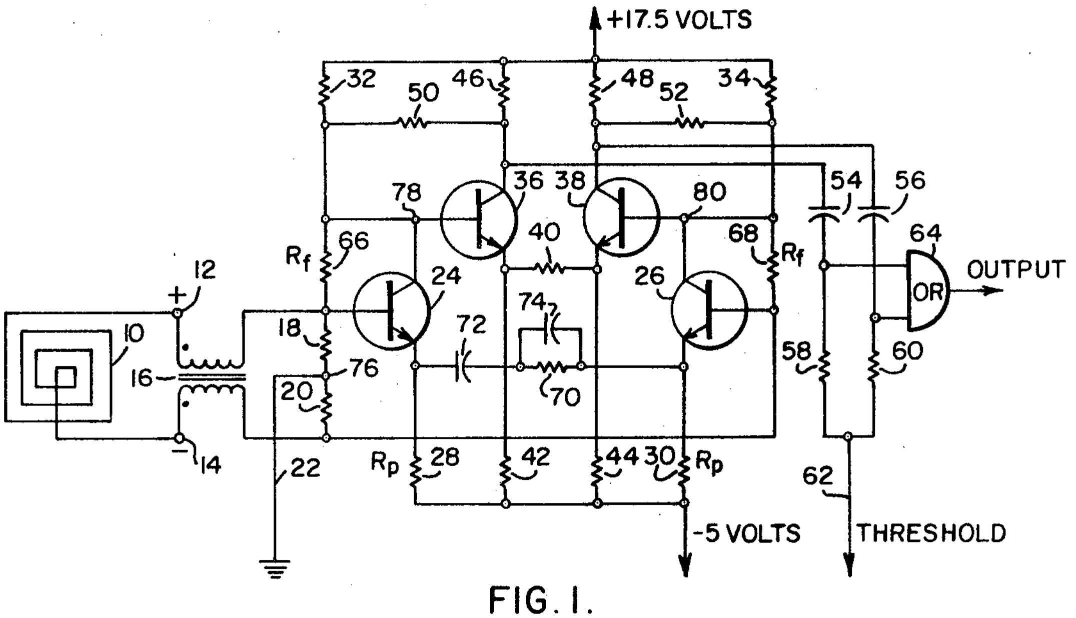

The collectors of the output amplifying transistors 36 and 38 are also connected through capacitors 54 and 56 and resistors 58 and 60, respectively, to a source of threshold voltage on lead 62. As will be seen, the level of threshold voltage source must be overcome by output signals of sufficient amplitude from transistors 36 and 38 before they will cause the OR circuit 64 to change its state. The OR circuit will produce an output whenever a sufficient change in signal level appears on the collector of either transistor 36 or transistor 38.

In shunt with the base-collector junctions of transistors 24 and 26 are resistors 66 and 68, respectively. The circuit is completed by means of a connection between the emitters of the transistors 24 and 26 comprising resistor 70 and capacitor 72 in series, the resistor 70 being in shunt with a low capacitance capacitor 74.

In the operation of the circuit, let us assume that common-mode voltages are applied through the input terminals 12 and 14. Under these circumstances, signals of the same polarity and magnitude with respect to point 76 will appear at the bases of transistors 24 and 26. Let us assume, for example, that these voltages are positive with respect to point 76, the junction of resistors 18 and 20. Consequently, the voltage on the base of transistor 24, for example, will move up (i.e., become more positive). As a result, the current through resistor 66 falls; but since the emitter of transistor 24 follows its base in voltage, the voltage on the emitter of transistor 24 also moves up, resulting in an increase in current through resistor 28. Assuming that the resistors 66 and 28 are properly proportioned, the common-mode gain of the transistor 24 can be made zero, meaning that the voltage at its collector (i.e., point 78) will not vary in response to common-mode voltages.

Figure 2:
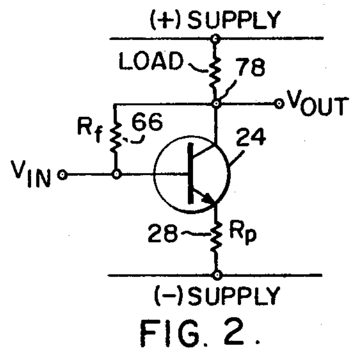

With reference to FIG. 2, the resistance of resistor 66 will be designated $R_f$ and that of resistor 28 $R_p$. In accordance with the invention, and in order to provide for a common-mode voltage rejection, the resistances $R_f$ and $R_p$ must satisfy the following equation:

$$R_f=\frac{1}{\alpha}(R_p+r_e)$$

where $r_e$ is the equivalent circuit emitter resistance and $\alpha$ is the common base current gain of the transistor. With this arrangement, it can be seen that any drop in current through resistor 66 tending to raise the voltage at point 78 will be compensated for by an increase in current through resistor 28 and transistor 24, which tends to reduce the voltage at point 78. In other words, there are two parallel current paths leading to point 78; and as long as the total effective resistances in the two paths are equal, any decrease in current in one path will be compensated for by an increase in current in the other path such that the voltage at point 78 will not vary in response to common-mode voltages. Stated in other words, as $v_{in}$ is raised (FIG. 2), the current through $R_p$ and, hence, the collector current is raised. However, the current through $R_f$ is lowered. With the stated value for $R_f$, the amount of increase and decrease will exactly balance, thus allowing $v_{in}$ to change without changing $v_{out}$. Note, however that the emitter voltage does change.

The same is true of transistor 26 wherein the resistor 68 has a resistance equal to $R_f$ and the resistor 30 has a resistance equal to $R_p$. Point 80 (i.e., the collector of transistor 26) will always remain at the same voltage level in response to common-mode voltages because of the aforesaid proportioning of the resistors 68 and 30.

Figure 3:
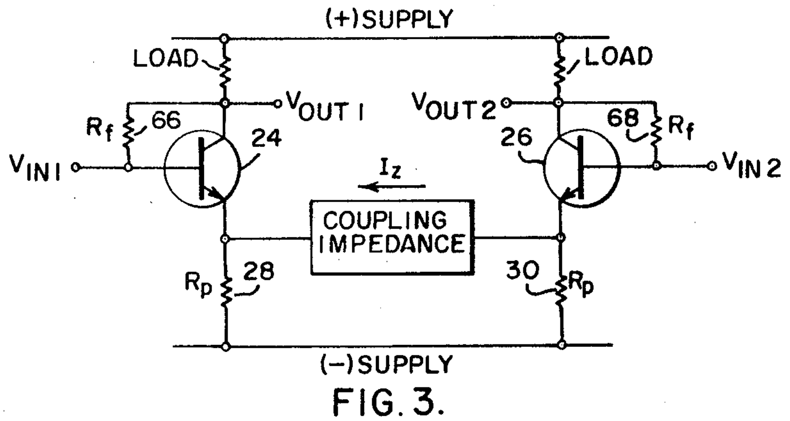

Now, let us assume that true differential signals of opposite polarity are applied to the bases of the transistors 24 and 26. Under these circumstances, the emitter of transistor 24, for example, may be positive with respect to signal ground while the emitter of transistor 26 is negative. As a result, current flows through the current path including resistor 70 and capacitor 72. This upsets the balanced voltage condition at points 78 and 80, thereby producing a change in the voltage at the bases of transistors 36 and 38 to produce output signals which cause the OR circuit 64 to change states, assuming that these signals are of a magnitude sufficient to overcome the threshold voltage applied to lead 62. This can perhaps best be explained by reference to FIG. 3. If $v_{in\,1}$ is not equal to $v_{in\,2}$ then a coupling current $I_z$ will flow through the coupling impedance, upsetting the current balance and causing $v_{out\,1}$ to be different than $v_{out\,2}$. However, as long as $v_{in\,1} = v_{in\,2}$, then $v_{out\,1} = v_{out\,2}$. The configuration of FIG. 1 consists of two cascaded stages of the type shown in FIG. 3, with coupling impedances 70, 72, 74 in the first stage and 40 in the second stage.

Typical component values of a circuit structured in accordance with the teachings of the invention and found to work satisfactory are as follows:

| | |
|---|---|
| Transistors 24, 26, 36, and 38 | Type 2N918 |
| Resistors 32 and 34 | 2,740 ohms |
| Resistors 46 and 48 | 1,500 ohms |
| Resistors 50 and 52 | 13,000 ohms |
| Resistors 66 and 68 | 3,570 ohms |
| Resistors 28 and 30 | 3,320 ohms |
| Resistors 42 and 44 | 3,570 ohms |
| Resistors 18 and 20 | 51 ohms |
| Resistor 40 | 75 ohms |
| Resistor 70 | 100 ohms |
| Capacitor 72 | 0.1 microfarad |
| Capacitor 74 | 100 picofarads |
| Capacitors 54 and 56 | 0.05 microfarads |
| Resistors 58 and 60 | 2,000 ohms |

The present invention thus provides a differential amplifier that achieves good common-mode rejection while maintaining a perfect symmetry. In this respect, it can be easily layed out in a symmetrical manner so that inevitable stray capacitances are well balanced. Thus, the spurious conversion of a common-mode signal to a differential mode signal is kept to a minimum.

Although the invention has been shown in connection with a certain specific embodiment, it will be readily apparent to those skilled in the art that various changes in the form and arrangement of parts may be made to suit requirements without departing from the spirit and scope of the invention.

I claim as my invention:

1. In a differential amplifier, a pair of transistor devices each having an emitter, a base and a collector, means for applying two equal and opposite voltages to the respective bases of said transistors, a first pair of signal feedback resistors connected in shunt with the base-collector junctions of said transistors, each of said first pair of resistors having a resistance value $R_f$, a second pair of resistors connecting the respective emitters of said transistors to a source of potential of one polarity, each of said second pair of resistors having a resistance value $R_p$, means connecting the collectors of said transistors to a source of potential of the opposite polarity, an electrical connection between said emitters, and output amplifying transistors having their bases connected to the collectors of said first-mentioned transistors, the resistance values $R_f$ and $R_p$ satisfying the equation:

$$R_f=\frac{1}{\alpha}(R_p+r_e)$$

where $r_e$ is the emitter resistance of each of the respective first-mentioned transistors and $\alpha$ is the common base current gain of the respective first-mentioned transistors, whereby common-mode voltages applied to said input terminals will not change the voltage levels at the collectors of said first-mentioned transistors and no change in signal level will appear at the outputs of said output amplifying transistors in response to such common-mode voltages.

2. The differential amplifier of claim 1 wherein the electrical connection between said emitters comprises a resistor in series with a capacitor.

3. The differential amplifier of claim 2 including a capacitor in shunt with said last-named resistor.

4. The differential amplifier of claim 1 wherein the collector of each of said output amplifying transistors is connected to said source of a potential of the opposite polarity and the emitters of said last-named transistors are each connected to said source of potential of one polarity.

5. The differential amplifier of claim 1 wherein the outputs of said input amplifying transistors are connected to the input of an OR circuit.

6. The differential amplifier of claim 5 wherein the collectors of said output amplifying transistors are each connected to a source of threshold voltage through a capacitor and a resistor in series, an OR circuit, and means connecting the junctions of said capacitors and resistors to the inputs of said OR circuit.

7. The differential amplifier of claim 1 wherein the means for applying two equal and opposite voltages to the respective bases of said first-mentioned transistors comprises a winding on a magnetic core memory, means connecting one end of said winding to the base of one said first-mentioned transistors and means connecting the other end of said winding to the base of the other of said first-mentioned transistors.

8. The differential amplifier of claim 1 including a balun transformer connecting opposite ends of said winding to the bases of said first-mentioned transistors.

* * * * *